United States Patent [19]
Ito et al.

[11] 3,983,577
[45] Sept. 28, 1976

[54] INTRODUCTION OF DATA ENTRY COMPLETION SIGNALS TO A CASSETTE TAPE CONTAINING DATA PROCESSING TERMINAL UNIT

[75] Inventors: Youichi Ito, Osaka; Kozo Kitamura, Kyoto, both of Japan

[73] Assignee: Sharp Kabushiki Kaisha, Osaka, Japan

[22] Filed: Aug. 27, 1974

[21] Appl. No.: 500,928

[30] Foreign Application Priority Data
Aug. 30, 1973 Japan.............................. 48-98055

[52] U.S. Cl................................. 360/4; 340/172.5; 360/60
[51] Int. Cl.².................... G11B 19/04; G11B 15/04
[58] Field of Search................. 360/4, 5, 94, 95, 96, 360/50, 55, 60; 340/172.5; 235/61.11 D

[56] References Cited
UNITED STATES PATENTS
| | | | |
|---|---|---|---|
| 2,921,293 | 1/1960 | Bartlet | 360/50 |
| 3,671,683 | 6/1972 | Rahenkamp | 360/4 |
| 3,806,666 | 4/1974 | Hoshizume | 360/96 |

OTHER PUBLICATIONS
"Dolby-ized Cassette Recorders," article by Julian D. Hirsch in *Tape Recorder Guide*, Spring 1972.

*Primary Examiner*—Bernard Konick
*Assistant Examiner*—Jay P. Lucas
*Attorney, Agent, or Firm*—Stewart and Kolasch, Ltd.

[57] ABSTRACT

The data processing terminal unit in the form of a point of sale transaction device disclosed herein contains a keyboard for introducing data into the data processing terminal unit and a cassette tape deck which includes a cassette type magnetic tape and a cassette tape recording scheme for data storage. There are provided an E key and an M key on the keyboard for introducing end marking signals (EM signals) which indicates completion of data entry. The EM signals are introduced into the data processing terminal unit when the E key and the M key are depressed successively or simultaneously, thereby preventing erroneous introduction of the EM signals at an undesired time.

6 Claims, 6 Drawing Figures

INTRODUCTION OF DATA ENTRY COMPLETION SIGNALS TO A CASSETTE TAPE CONTAINING DATA PROCESSING TERMINAL UNIT

BACKGROUND AND SUMMARY OF THE INVENTION

This invention relates to an improvement in a data processing terminal unit containing a cassette type magnetic tape therein.

In the past, there have been developed data transaction or manipulation systems of the type wherein data entries occurring at a point of sale terminal such as utilized in a retail sales store are recorded through a keyboard on a cassette type magnetic tape which in turn, is coupled with a central data processing computer system through a medium converter such as a tape to tape converter. When it is desired to record data entries on the cassette tape, predetermined markings such as a tape mark (TM) and an end mark (EM) should be written at the beginning point and ending point of data record field of the cassette tape. In the event that the operator erroneously instructs to enter EM signals into the cassette tape at an undesired time, this will result in erroneous operation when handling data received form the data processing terminal unit, since the central data processing computer system is adapted to handle only the data interposed between the TM mark and the EM mark.

Accordingly, it is an object of the present invention to provide a data processing terminal unit which can prevent erroneous introduction of the EM signals into the data processing terminal unit at an undesired time.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention wlll become apparent to those skilled in the art from this detailed description.

To achieve the above objective, the data processing terminal unit of the present invention is provided with a first entry key or an E key and a second entry key or an M key on a keyboard thereof. The EM signals are introduced into the data processing terminal unit when the E key and the M key are depressed in succession or simultaneously.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
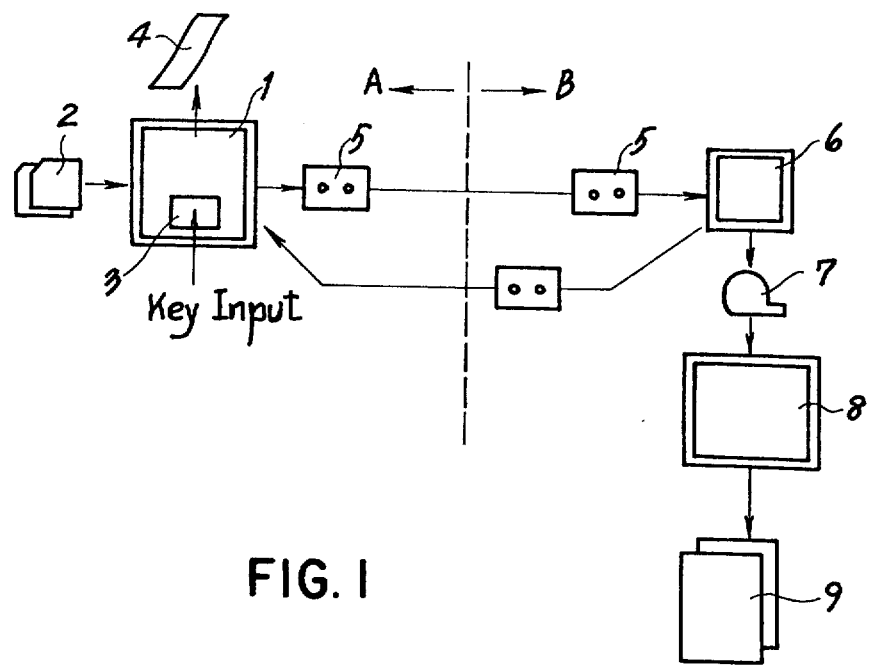
FIG. 1 is a schematic block diagram of a data processing system employing a cassette tape.

Referring now to FIG. 1, there is illustrated a data processing system utilizing a cassette type magnetic tape which is useful for handling a large number of slip data contained in, for example, deliver slips and transfer slips. That is, data included on a slip 2 are introduced by means of a keyboard 3 and so on into a data processing terminal unit 1 located on a data source A such as a retail sales store and a branch office, and then are printed on a journal 4 and recorded on a cassette type magnetic tape 5 in the form of digital signals.

Thereafter, the cassette tape 5 carrying the transaction data thereon is sent to a central computer system center B positioned on a head office. The transaction data are rewritten through a tape converter 6 into an appropriate record medium accessible to computers for example a ½ inch magnetic tape which is coupled with a computer 8 for handling data and performing arithmetic and statistic operations to provide various resulting data 9.

Figure 2:
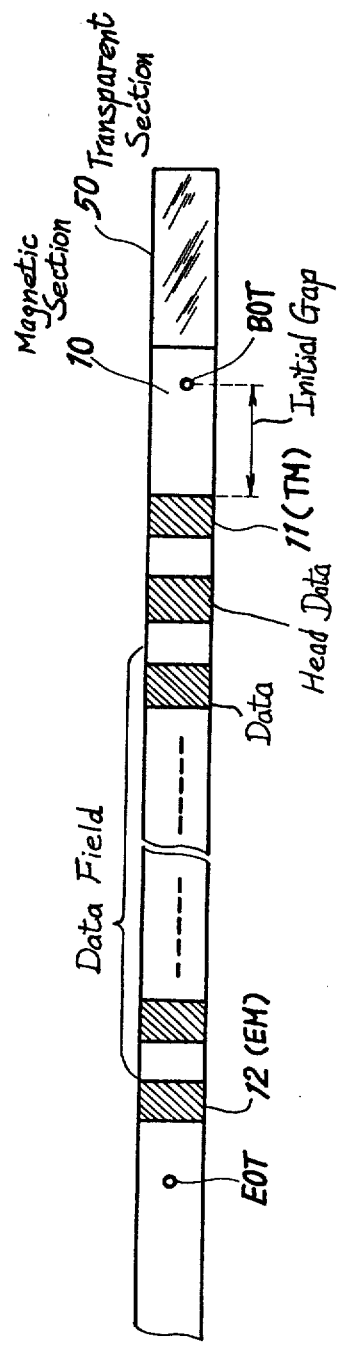
FIG. 2 is a format diagram of data and control markings recorded on the cassette tape.

In such a system, after the cassette tape 5 is loaded into the tape converter 6 which in turn is coupled with the computer 8, the cassette tape 5 is returned to the data source A in order to accept new data through the data processing terminal unit 1. As illustrated in FIG. 2, the cassette tape 5 is composed of a magnetic section 10 and a transparent section 50 and, within the magnetic section 10, a control block known as tape marking (TM signal) 11 which consists of a preamble, two bytes of eight ZERO bits each and a postamble, should be written just after a beginning-of-tape (BOT) hole or slot. Thus, the data may be recorded on a data field following the beginning-of-tape hole. Furthermore, it is necessary that end marking (EM signal) 12 be written upon completion of data entry. This is because the conventional tape converter 6 is adapted to read out only the data interposed between the TM signal 11 and the EM signal 12.

The writing of the EM signal 12 onto the cassette tape 5 is very important and must be instructed deliberately. Once the EM signal 12 is written onto the cassette tape 5, the data following the EM signal can not be read out by the computer 8. In the conventional data processing terminal unit, an EM signal entry key is provided on the keyboard which has various function keys and digit keys. Therefore, there is a considerable possibility that the operator may erroneously depress the EM signal entry key at an undesired time. This will result in erroneous operation in the data processing system when handling data by the computer 8. Even though the operator of the data processing terminal unit 1 notices the miss depression of the EM signal entry key, the previously written data must be erased and the data must be written again onto the cassette tape 5 from the beginning of the data in order to prevent the erroneous operation.

To prevent error in the generation of an instruction for writing the EM signal onto the cassette tape at an undesired time, the data processing terminal unit in accordance with the present invention is designed to be provided with a first entry key or an E key and a second entry key or an M key on the keyboard and to write the EM signal onto the cassette tape when the E key and the M key are depressed in succession or simultaneously.

Figure 3:
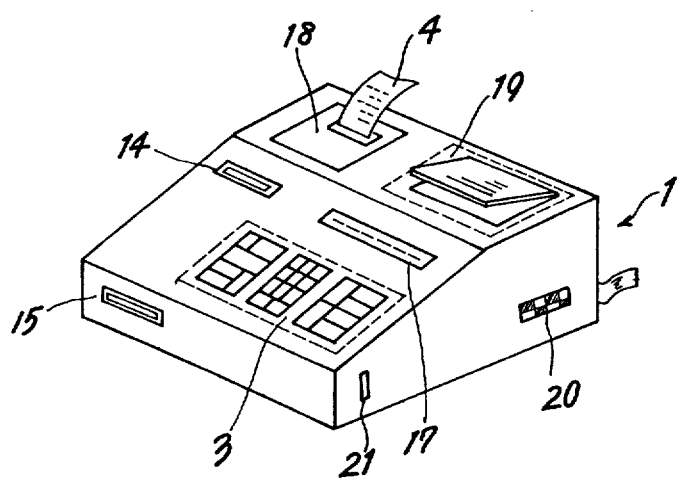
FIG. 3 is a perspective view of a data processing terminal unit wherein the present invention may be embodied.

FIG. 3 illustrates a preferred form of the data processing terminal unit 1 used with the invention, wherein the reference number 14 represents a card inlet which is utilized when slip data are inputted through a card, while the reference number 15 represents a card outlet. A keyboard 3 includes a set of mannually operable digit keys and a set of function keys such as register, verify, correct, cancel and clear keys. The terminal unit 1 is further provided with a visual display panel 17, a printing unit 18, a cassette tape recording deck 19, a select switch 20 and a power switch 21.

Figure 4:
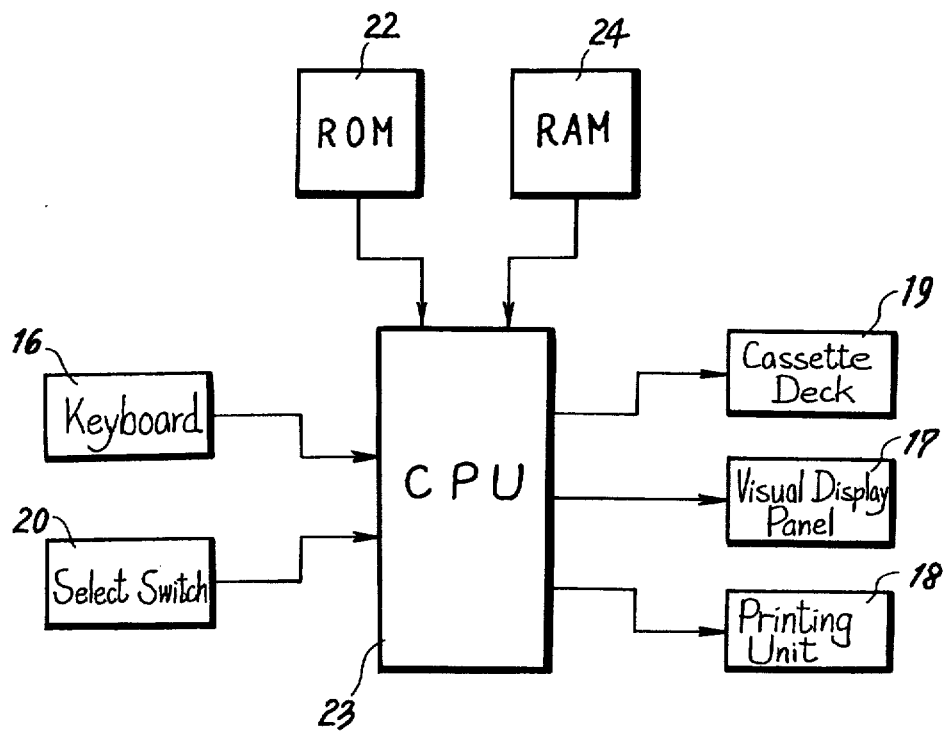
FIG. 4 is a schematic block diagram of circuit components of the data processing terminal unit.

The data processing terminal unit is sequentially controlled by a central processing unit (CPU) 23 in accordance with a control program included in a read-only memory (ROM) 22 as illustrated in FIG. 4. In this drawing, the reference number 24 represents a random-access memory (RAM) which stores input data.

Figure 5:
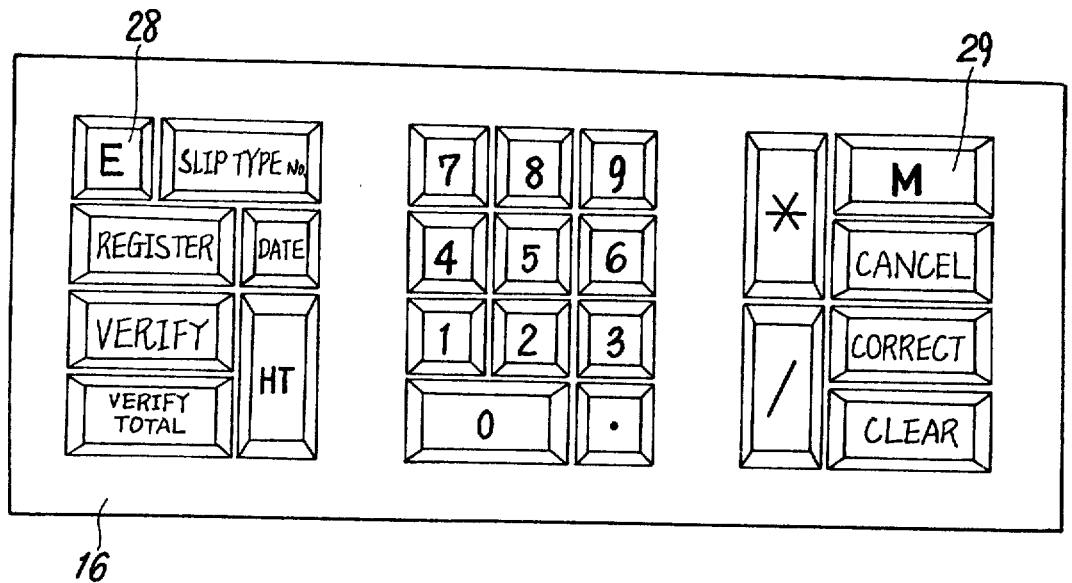
FIG. 5 is a plan view of a keyboard installed on the data processing terminal unit.

Referring now to FIG. 5, there is illustrated a keyboard 3 of the data processing terminal unit having the E key 28 and the M key 29 on both side portions thereof. The EM signal is written onto the cassette tape 5 when the E key 28 and the M 29 are depressed in succession or simultaneously. The EM signal is not written onto the cassette tape 5 when one or more of the digit keys are depressed between the depressions of the E key and the M key, or when the E key and the M key are momentarily depressed in the opposite order, such that the M key is released before the E key is depressed.

Figure 6:
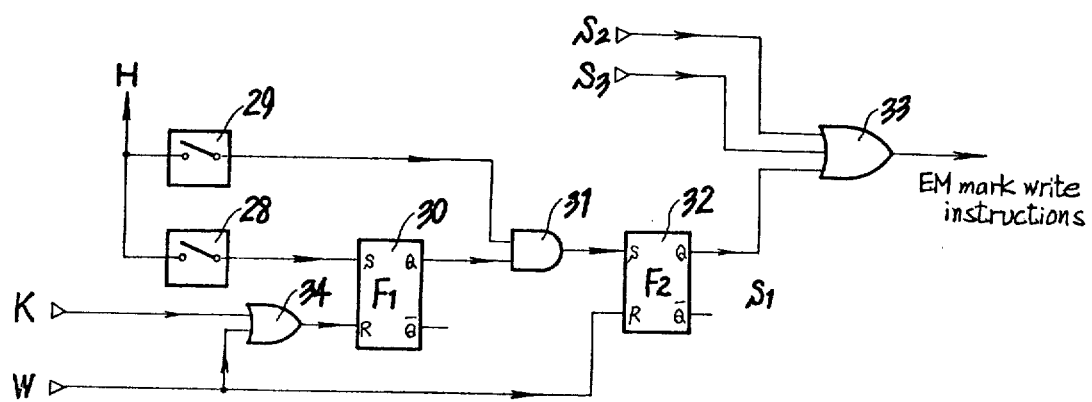
FIG. 6 is a schematic circuit diagram of an EM signal generation circuit in the preferred form of the present invention.

FIG. 6 shows a typical circuit construction suited for generating an instruction signal which instructs the cassette tape recording deck to write the EM mark onto the cassette tape. When a first flip-flop 30 is in a set condition upon depression of the E key 28, a second flip-flop 32 is set through an AND gate 31 upon depression of the M key 29, thereby the EM mark write instructions signal is generated through an OR gate 33. A key input signal K which is generated upon depression of any one of the input keys except the E key and the M key is conducted to the reset terminal of the first flip-flop 30 through an OR gate 34. A control signal W which is generated upon completion of the writing of the EM mark onto the cassette tape by employing conventional technique such as a read after write check method, is conducted to the reset terminal of the first flip-flop 30 and the reset terminal of the second flip-flop 32.

The EM mark write instruction signal generated by utilizing any one of a control signal $S_1$ which is generated upon depression of the E key and the M key in succession or simultaneously, another control signal $S_2$ which is generated by detecting an end-of-tape (EOT) hole or slot on the cassette tape and still another control signal $S_3$ which is generated when the writing of the date is erroneously operated three times.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A data processing terminal unit comprising:
   tape means including at least one data field;
   recording means associated with said tape means for recording data thereon;
   data input means connected with said recording means for transmitting data therethrough to said tape means;
   entry means in said data input means providing end marking signals to said recording means to effect end markings on said tape means defining the end of said data field, said entry means including first and second switches for generating said end marking signals in response to operation of both of said switches; and
   control circuit means interconnecting said first and second switches for precluding the generation of said end marking signals unless said first and second switches are operated in a predetermined timed relationship, said predetermined timed relationship being the successive operation of said first switch and then said second switch.

2. The data processing terminal unit as set forth in claim 1 wherein said data input means comprises a keyboard means and said first and second switches comprise first and second entry keys on said keyboard means.

3. The data processing unit as set forth in claim 2 wherein said first and second entry keys are disposed on opposite side portions of said keyboard, respectively.

4. A data processing terminal unit comprising:
   tape means including at least one data field;
   recording means associated with said tape means for recording data thereon;
   data input means connected with said recording means for transmitting data therethrough to said tape means;
   entry means in said data input means providing end marking signals to said recording means to effect end markings on said tape means defining the end of said data field, said entry means including first and second switches for generating said end marking signals in response to operation of both of said switches; and
   control circuit means interconnecting said first and second switches for precluding the generation of said end marking signals unless said first and second switches are operated in a predetermined timed relationship, said predetermined time relationship being the simultaneous operation of said first and second switches.

5. A data processing terminal unit comprising:
   tape means including at least one data field;
   recording means associated with said tape means for recording data thereon;
   data input means connected with said recording means for transmitting data therethrough to said tape means;
   entry means in said data input means providing end marking signals to said recording means to effect end markings on said tape means defining the end of said data field, said entry means including first and second switches for generating said end marking signals in response to operation of both of said switches; and
   control circuit means interconnecting said first and second switches for precluding the generation of said end marking siangls unless said first and second switches are operated in a predetermined timed relationship, said control circuit means comprising a first flip-flop having a set terminal coupled to said first switch, an AND gate, and a second flip-flop the output terminal of which is connected to the set output terminal of the first flip-flop and the output terminal of said first switch through said AND gate, the set output signal of said second flip-flop generating said end marking signals.

6. A data processing terminal unit comprising:

tape means including at least one data field;

recording means associated with said tape means for recording data thereon;

data input means connected with said recording means for transmitting data therethrough to said tape means;

entry means in said data input means providing end marking signals to said recording means to effect end markings on said tape means defining the end of said data field, said entry means including first and second switches for generating said end marking signals in response to operation of both of said switches; and control circuit means interconnecting said first and second switches for precluding the generation of said end marking signals unless said first and second switches are operated in a predetermined timed relationship, said control circuit means further including means for precluding the generation of an end marking signal if a data input is made in a time period between the operation of said first and second switches.

* * * * *